United States Patent
Celebioglu et al.

(10) Patent No.: US 7,436,826 B2
(45) Date of Patent: Oct. 14, 2008

(54) SYSTEM AND METHOD FOR DETECTING AND INDICATING COMMUNICATION PROTOCOLS

(75) Inventors: Onur Celebioglu, Austin, TX (US); Jenwei Hsieh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1024 days.

(21) Appl. No.: 09/912,903

(22) Filed: Jul. 25, 2001

(65) Prior Publication Data

US 2003/0021272 A1     Jan. 30, 2003

(51) Int. Cl.
*H04L 12/28* (2006.01)

(52) U.S. Cl. .......................... 370/389; 370/401; 370/469

(58) Field of Classification Search .................. 370/445, 370/389, 393, 474, 392, 395.3, 428, 463, 370/465, 466, 469
See application file for complete search history.

(56) References Cited

U.S. PATENT DOCUMENTS

| | | | | |
|---|---|---|---|---|
| 5,042,032 A * | 8/1991 | Dighe et al. | ................. | 370/231 |
| 5,260,970 A * | 11/1993 | Henry et al. | ................. | 375/224 |
| 5,347,524 A * | 9/1994 | I'Anson et al. | ................. | 714/39 |
| 5,613,873 A | 3/1997 | Bell, Jr. | | |
| 5,838,989 A * | 11/1998 | Hutchison et al. | ............. | 710/11 |
| 5,842,039 A * | 11/1998 | Hanaway et al. | ............. | 710/11 |
| 6,072,803 A * | 6/2000 | Allmond et al. | ............. | 370/445 |
| 6,486,791 B1 * | 11/2002 | Crawford | ............... | 340/815.45 |
| 6,693,550 B1 * | 2/2004 | Heiler et al. | ........... | 340/815.45 |
| 6,721,353 B1 * | 4/2004 | Taubert et al. | ............... | 375/220 |
| 6,778,505 B1 * | 8/2004 | Bullman et al. | ............. | 370/254 |
| 6,940,862 B2 * | 9/2005 | Goudreau | ............... | 370/395.52 |
| 2002/0010787 A1 * | 1/2002 | Masuda | ...................... | 709/230 |
| 2002/0039028 A1 * | 4/2002 | Douglas et al. | ................. | 324/658 |
| 2002/0105911 A1 * | 8/2002 | Pruthi et al. | ................. | 370/241 |
| 2002/0161924 A1 * | 10/2002 | Prrin et al. | .................. | 709/240 |
| 2002/0163935 A1 * | 11/2002 | Paatela et al. | ............... | 370/466 |
| 2002/0172220 A1 * | 11/2002 | Baker et al. | ................. | 370/465 |
| 2002/0180612 A1 * | 12/2002 | Crawford | ............... | 340/815.45 |
| 2003/0210697 A1 * | 11/2003 | Mercier | .................... | 370/395.1 |

* cited by examiner

*Primary Examiner*—Bob A Phunkulh
(74) *Attorney, Agent, or Firm*—Haynes and Boone, LLP

(57) ABSTRACT

A system that includes a first indicator, a second indicator, and a device associated with the first indicator and the second indicator is provided. The device is configured to receive a packet. The device is also configured to detect a first protocol associated with the packet and cause the first indicator to be activated in response to detecting the first protocol. The device is further configured to detect a second protocol associated with the packet and cause the second indicator to be activated in response to detecting the second protocol.

15 Claims, 3 Drawing Sheets

SYSTEM AND METHOD FOR DETECTING AND INDICATING COMMUNICATION PROTOCOLS

BACKGROUND

The disclosures herein relate generally to devices utilizing communication protocols and, more particularly, to a system and method for detecting and indicating communication protocols.

Communication devices such as routers, switches, and NIC's (network interface cards) communicate using predefined methods that are formalized as protocols. For increased cost efficiency and interoperability, a communication device may include support for more than one protocol. The challenge for users of such a device is determining the protocol or protocols being used at a given time to identify and resolve communication issues.

It would be desirable for a user of a device utilizing communication protocols to be able to determine the protocol or protocols used at a given time in order to reduce time and costs associated with identifying and resolving communication issues. Accordingly, what is needed is a system and method for detecting and indicating communication protocols.

SUMMARY

One embodiment, accordingly, provides a system that includes a first indicator, a second indicator, and a device associated with the first indicator and the second indicator. The device is configured to receive a packet. The device is also configured to detect a first protocol associated with the packet and cause the first indicator to be activated in response to detecting the first protocol. The device is further configured to detect a second protocol associated with the packet and cause the second indicator to be activated in response to detecting the second protocol.

A principal advantage of this embodiment is that various shortcomings of previous techniques are overcome. For example, the embodiment provides a user with the ability to determine the communication protocol or protocols used by a system at a given time. Accordingly, time and costs associated with identifying and resolving communication issues may be reduced.

DETAILED DESCRIPTION

Figure 1A:
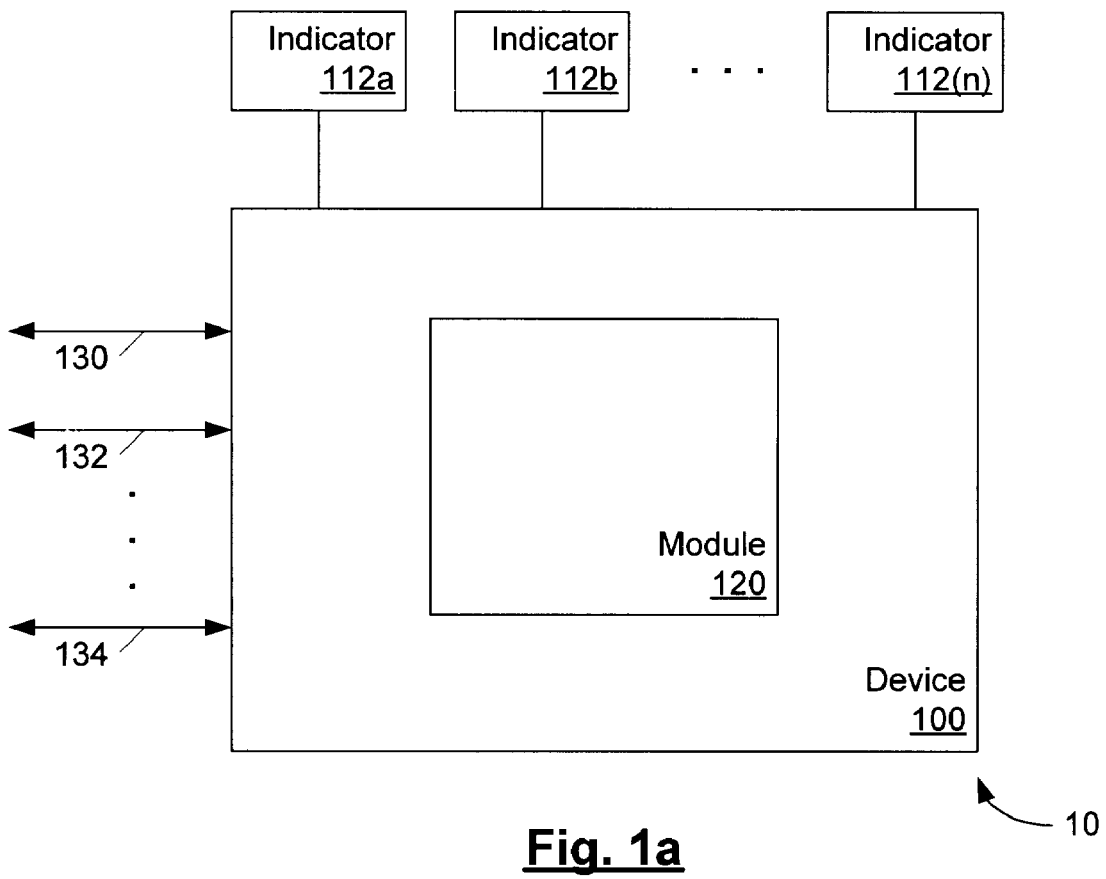
FIG. 1a is a diagram illustrating an embodiment of a system for detecting and indicating communication protocols.

FIG. 1a is a diagram illustrating an embodiment of a system 10 for detecting and indicating communication protocols. System 10 includes a device 100 and a plurality of indicators 112a and 112b through 112(n). System 10 may include any number of indicators 112 as indicated by the ellipsis between indicator 112b and indicator 112(n). Indicators 112a and 112b through 112(n) may be referred to herein collectively as indicators 112 or individually as an indicator 112. Device 100 includes a module 120.

Device 100 is configured to receive and/or transmit communications signals to communicate with other devices (not shown) using a plurality of connections as indicated by arrows 130,132, and 134. Arrows 130,132 and 134 represent computer networks, direct electrical connections, wireless connections, or any other connection configured to allow device 100 to communicate with other devices. Other embodiments may include other types or numbers of communication signals as indicated by the ellipsis between arrow 132 and arrow 134.

Device 100 also includes module 120. Module 120 is configured to detect one or more protocols associated with a communications signal such as a packet. Module 120 causes an indicator 112 to be activated in response to detecting each protocol. For example, module 120 may cause indicator 112a to be activated in response to detecting a first protocol associated with a communications signal and may cause indicator 112b to be activated in response to detecting a second protocol associated with the communications signal. Additional indicators 112 may be activated in response to detecting additional protocols associated with the communications signal. Module 120 may cause protocols associated with a communications signal to be detected simultaneously or sequentially. Likewise, module 120 may cause indicators 112 associated with each detected protocol to be activated simultaneously or sequentially. In this way, multiple indicators 112 may be activated at any given time to indicate multiple protocols being used by device 100 at the given time.

Indicators 112 may each be any suitable device configured to provide visual indications to a person such as a light or a light-emitting diode (LED). Indicators 112 each include an ability to indicate at least two possible states. For example, an indicator 112 may be off to indicate a first state and illuminated to indicate a second state. In this example, the first state may indicate that a protocol has not been detected by module 120 and the second state may indicate that a protocol has been detected by module 120. Accordingly, module 120 activates an indicator 112 by causing indicator 112 to reveal a particular state. Module 120 may also cause an indicator 112 to be set or reset to a different state.

Indicators 112 may be activated in a number of ways. In one embodiment, each indicator 112 is associated with a particular protocol and includes a light. Module 120 causes the light to be turned on in response to detecting the use of the protocol by device 100. In other embodiments, indicators 112 may include one or more devices configured to generate various sounds in response to being activated. In further embodiments, indicators 112 may include devices configured to display characters to indicate a detected protocol or detected protocols.

Module 120 may include one or more hardware components and/or one or more programs (i.e. software components) configured to perform the functions described herein. For example, module 120 may be a hardware module included in device 100. As another example, a program or other code embodying the functions of module 120 may be included as a part of a device driver of device 100, a firmware of device 100, an operating system, an application level library function, or any other program configured to detect protocols associated with communications signals. In an embodiment where module 120 includes a software component, module 120 may detect protocols by detecting device driver or application library calls.

In one embodiment, device 100 is a router. A router is a device that couples to two or more networks, receives communication signals from the networks, and transmits communication signals to the networks. A router may determine which network to transmit the communications signals in response to a table of routes included in the router. In another embodiment, device 100 is a switch coupled to other devices. A switch receives and/or transmits communication signals between the devices allowing the devices to communicate. In a further embodiment, device 100 is a network interface card (NIC). A NIC couples a first device such as a computer system to a network to allow the first device to communicate with other devices. In still a further embodiment, device 100 is a storage device coupled to another device. The storage device transmits communication signals to and/or receives communication signals from the device to facilitate data storage transactions. In yet a further embodiment, device 100 is a network adapter configured to communicate with different devices using different protocols. The network adapter may be located on a card that is included as part of another device. In other embodiments, device 100 may include any device configured to transmit and/or receive communication signals.

Figure 1B:
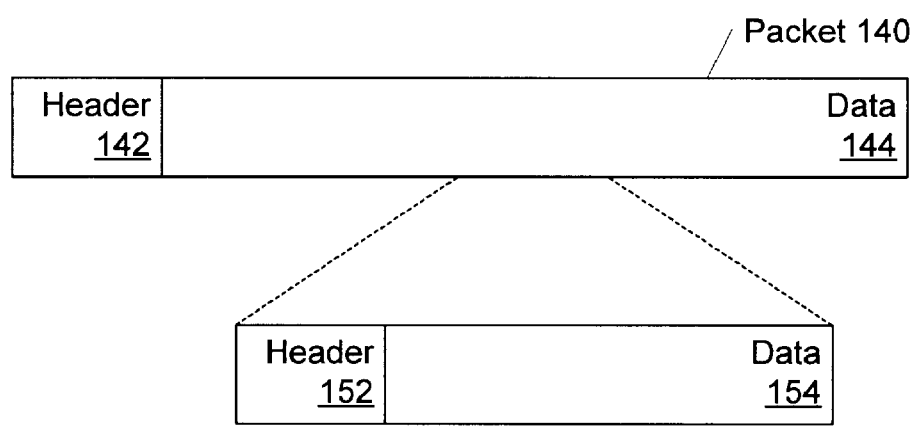
FIG. 1b is a diagram illustrating an embodiment of a packet.

FIG. 1b is a diagram illustrating an embodiment of a packet 140. Packet 140 is one example of a communications signal that may be transmitted or received by device 100. Module 120 may detect one or more protocols used by device 100 at any given time by detecting information in packet 140.

Packet 140 includes a first header 142 and a data 144. Data 144 includes a second header 152 and a second data 154. Second data 154 may contain an additional header (not shown) and data (not shown). Headers 142 and 152 may include information about the packet such as a destination address, an origination address, a size of packet 140, and an indication of a protocol. The information may be specific to one or more protocols and may be used to determine one or more protocols associated with the packet. Accordingly, in one embodiment, module 120 may detect a first protocol associated with packet 140 in response to information included in first header 142. Module 120 may also detect a second protocol associated with the packet 140 in response to information included in the second header 152. Module 120 may further detect other protocols using other headers (not shown) in packet 140.

Figure 2:
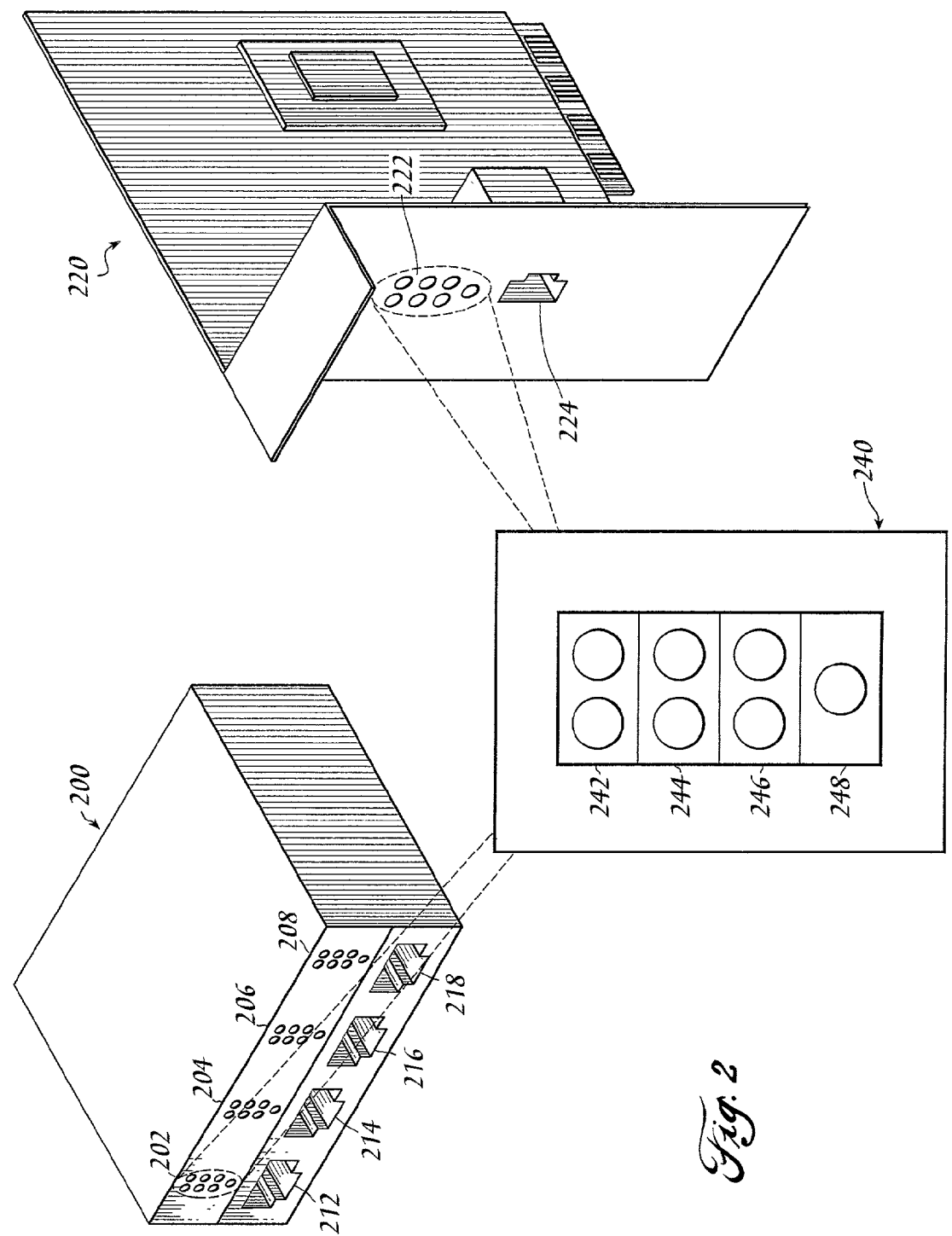
FIG. 2 is a diagram illustrating an embodiment of a plurality of indicators coupled to a first device and an embodiment of a plurality of indicators coupled to a second device.

The operation of the embodiment of FIG. 1 may be seen by way of examples in FIG. 2. FIG. 2 is a diagram illustrating an embodiment of a plurality of indicators 240 coupled to a device 200 and a device 220. Device 220 is a NIC and will be referred to as NIC 220.

In one embodiment, a plurality of indicator panels 202, 204, 206, and 208 is included in device 200. Device 200 may include a switch, a router, a storage device, and/or any other device configured to receive and/or transmit packets. Device 200 includes a plurality of connection interfaces 212, 214, 216, and 218. Each of the connection interfaces 212, 214, 216, and 218 may be coupled to a network, another device, a wireless connection device, or any other interface configured to facilitate communication with other devices. Each of plurality of indicator panels 202, 204, 206, and 208 is associated each of plurality of connection interfaces 212, 214, 216, and 218, respectively, as shown in FIG. 2. For example, the indicators included in indicator panel 202 are activated in response to detected protocols associated with connection interface 212.

In another embodiment, an indicator panel 222 is included in a NIC 220. NIC 220 includes a connection interface 224. Connection interface 224 may be coupled to a network, another device, a wireless connection device, or any other interface configured to facilitate communication with other devices. Indicator panel 222 is associated with connection interface 224. Accordingly, the indicators included in indicator panel 222 are activated in response to detected protocols associated with connection interface 224.

As shown in FIG. 2, indicator panel 240 includes a plurality of sets of indicators 242, 244, 246, and 248. Each of plurality of sets of indicators 242, 244, 246, and 248 may be associated with a different platform layer shown in FIG. 3 and described below. Each of plurality of sets of indicators 242, 244, 246, and 248 may include one or more indicators, and the number of indicators may depend on the number of protocols supported by device 200 or NIC 220 for the corresponding platform layer for the corresponding connection interface. In addition, each indicator included within each of plurality of sets of indicators 242, 244, 246, and 248 may correspond to a specific protocol supported by the corresponding platform layer by device 200 or NIC 220 for the connection interface to which the indicator panel corresponds.

In another embodiment (not shown), an indicator 240 may be located externally and/or remotely from an associated device. For example, an indicator 240 may be located on a rack that houses a device associated with the indicator 240.

Figure 3:
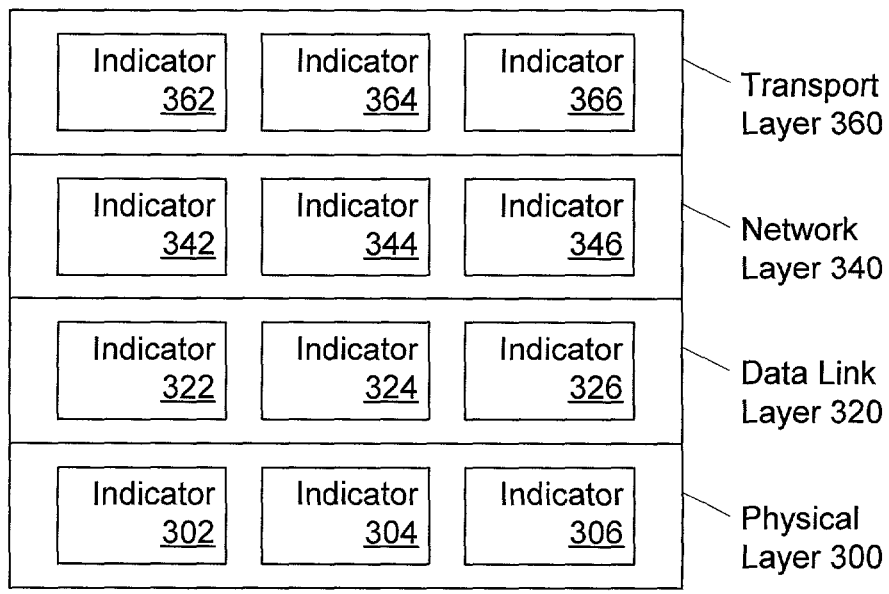
FIG. 3 is a diagram illustrating an embodiment of a plurality of indicators associated with a plurality of platform layers.

FIG. 3 is a diagram illustrating an embodiment of a plurality of indicators associated with a plurality of platform layers and a plurality of protocols. In the embodiment shown in FIG. 3, the layers include a physical layer 300, a data link layer 320, a network layer 340, and a transport layer 360.

Physical layer 300 includes indicators 302, 304, and 306. Each indicator 302, 304, and 306 is associated with a different protocol that operates in accordance with physical layer 300. Examples of physical layer 300 protocols include Fibre Channel, Ethernet, Synchronous Optical Network (SONET), and InfiniBand. Physical layer 300 is responsible for passing bits onto and receiving them from the connecting medium. Physical layer 300 handles the electrical and mechanical and/or wireless characteristics of the signals and signaling methods.

Data link layer 320 includes indicators 322, 324, and 326. Each indicator 322, 324, and 326 is associated with a different protocol that operates in accordance with data link layer 320. Examples of data link layer 320 protocols include IEEE 802.3 and High-level Data Link Control (HDLC). Data link layer 320 is responsible for node to node validity and integrity of a transmission.

Network layer 340 includes indicators 342, 344, and 346. Each indicator 342, 344, and 346 is associated with a different protocol that operates in accordance with network layer 340. Examples of network layer 340 protocols include Internet Protocol (IP) and Internetwork Packet Exchange (IPX). Network layer 340 establishes the route between the sending and receiving devices. The node to node function of data-link layer 320 may be extended across the entire internetwork.

Transport layer 360 includes indicators 362, 364, and 366. Each indicator 362, 364, and 366 is associated with a different protocol that operates in accordance with transport layer 360. Examples of transport layer 360 protocols include Transmission Control Protocol (TCP) and User Datagram Protocol (UDP). Transport layer 360 is responsible for overall end to end validity and integrity of a transmission. Data link layer 320 may only be responsible for delivering packets from one node to another. Thus, if a packet gets lost, transport layer 360 may detect that the packet has been lost.

Each layer 300, 320, 340, and 360 may also include other functions of an Open System Interconnection (OSI) layer defined by the OSI model. Other layers or other functions within each layer are possible and contemplated. In addition, the protocols listed above for each layer 300, 320, 340, and 360 may provide services to other layers.

Figure 4:
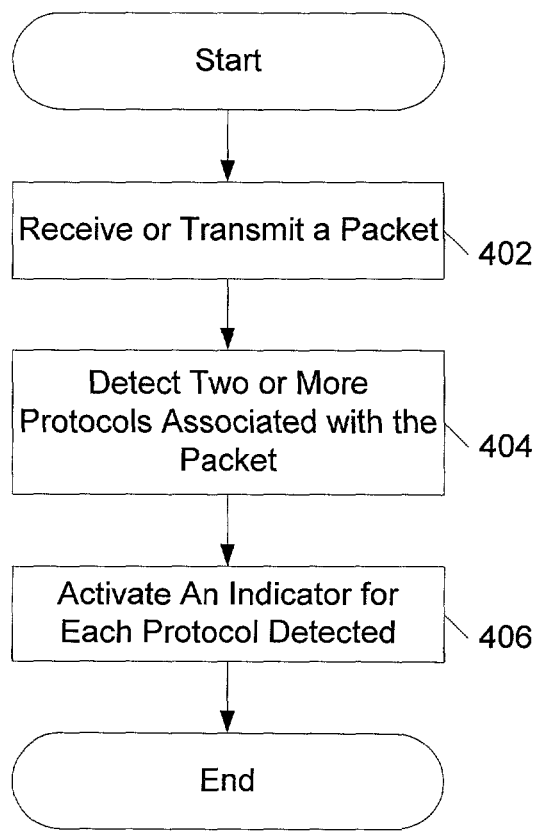
FIG. 4 is a flow chart illustrating an embodiment of a method for detecting and indicating communication protocols.

FIG. 4 is a flow chart illustrating an embodiment of a method for detecting and indicating protocols. In FIG. 4, a packet is received or transmitted by a device as indicated in 402. One or more protocols associated with the packet are detected as indicated in step 404. The protocols detected may be from the same or different platform layers in a layer model. Each protocol may be detected by examining one or more headers included in the packet. The detection of protocols in step 404 may be performed by one or more hardware and/or software components included in the device. An indicator is activated, as indicated in step 406, for each protocol detected in step 404.

As can be seen, the principal advantages of these embodiments are that various shortcomings of previous techniques are overcome. For example, the embodiment provides a user with the ability to determine the communication protocol or protocols used by a system at a given time. Accordingly, time and costs associated with identifying and resolving communication issues may be reduced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
a protocol detection module;
a device, coupled to the protocol detection module, for communicating a packet, the device including a plurality of sets of indicators associated with a connection interface, the indicators being activated in response to detected protocols associated with the interface;
each set of indicators being in a different platform layer and each indicator in each set being associated with a different protocol operating within its respective layer; and
the packet including a first header and a second header, wherein the device is configured to detect a first protocol in response to the first header, and wherein the device is configured to detect a second protocol in response to the second header;
whereby, in response to a packet being communicated with the device, one or more protocols associated with the packet being detected by the protocol detection module and the protocol detection module activating a respective indicator in a respective layer in response to the one or more detected protocols.

2. The system of claim 1, wherein the device includes a router.

3. The system of claim 1, wherein the device includes a switch.

4. The system of claim 1, wherein the device includes a storage device.

5. The system of claim 1, wherein the device includes a network interface card.

6. The system of claim 1, wherein the device includes at least one hardware component configured to detect the first protocol and the second protocol.

7. The system of claim 1, wherein the device includes a program configured to detect the protocol.

8. The system of claim 7, wherein the program includes a device driver.

9. A method comprising:
providing a device for communicating a packet coupled to a protocol detection module, the device including a plurality of sets of indicators associated with a connection interface, the indicators being activated in response to detected protocols associated with the interface;
providing each set of indicators in a different platform layer, each indicator in each set being associated with a different protocol operating within its respective layer;
detecting a first protocol in response to a first header included in the packet; and
detecting a second protocol in response to a second header included in the packet,
whereby, in response to a packet being communicated with the device, one or more protocols associated with the packet being detected by the protocol detection module and the protocol detection module activating a respective indicator in a respective layer in response to the one or more detected protocols.

10. The method of claim 9 wherein the device transmits a packet.

11. The method of claim 9 wherein the device receives a packet.

12. The method of claim 9, wherein the device includes a router.

13. The method of claim 9, wherein the device includes a switch.

14. The method of claim 9, wherein the device includes a storage device.

15. The method of claim 9, wherein the device includes a network interface card.

* * * * *